(12) United States Patent
Engelen

(10) Patent No.: US 11,805,727 B1
(45) Date of Patent: Nov. 7, 2023

(54) DEVICE FOR CONTROLLING DISCHARGE OF CLIPPINGS FROM A ROTARY LAWN MOWER

(71) Applicant: Michael Engelen, Cologne, MN (US)

(72) Inventor: Michael Engelen, Cologne, MN (US)

( * ) Notice: Subject to any disclaimer, the term of this patent is extended or adjusted under 35 U.S.C. 154(b) by 564 days.

(21) Appl. No.: 16/914,810

(22) Filed: Jun. 29, 2020

Related U.S. Application Data

(60) Provisional application No. 62/867,600, filed on Jun. 27, 2019.

(51) Int. Cl.
| | |
|---|---|
| *A01D 34/71* | (2006.01) |
| *A01D 34/81* | (2006.01) |
| *A01D 34/82* | (2006.01) |
| A01D 34/68 | (2006.01) |
| A01D 101/00 | (2006.01) |

(52) U.S. Cl.
CPC ............. *A01D 34/71* (2013.01); *A01D 34/81* (2013.01); *A01D 34/824* (2013.01); *A01D 34/68* (2013.01); *A01D 2101/00* (2013.01)

(58) Field of Classification Search
CPC ...... A01D 34/71; A01D 34/81; A01D 34/824; A01D 34/68; A01D 2101/00
See application file for complete search history.

(56) References Cited

U.S. PATENT DOCUMENTS

| | | | | |
|---|---|---|---|---|
| 6,874,309 B1 * | 4/2005 | Bellis, Jr. | ............. | A01D 42/005 |
| | | | | 56/320.2 |
| 7,337,602 B1 * | 3/2008 | Butler | .................. | A01D 34/005 |
| | | | | 56/320.2 |
| 7,624,562 B2 * | 12/2009 | Kallevig | ................ | A01D 34/71 |
| | | | | 56/320.2 |
| D700,630 S * | 3/2014 | Davis | ............................ | D15/17 |
| 9,192,100 B1 * | 11/2015 | Ullom | .................... | A01D 34/82 |
| 10,045,481 B2 * | 8/2018 | Chase | .................... | A01D 34/71 |
| 10,791,672 B2 * | 10/2020 | Berglund | ............... | A01D 34/71 |
| 11,483,973 B1 * | 11/2022 | Pernice | ................ | A01D 34/005 |
| 2020/0337231 A1 * | 10/2020 | Kelly | ................... | A01D 34/005 |

* cited by examiner

*Primary Examiner* — Kevin Hurley
*Assistant Examiner* — Marlon A Arce
(74) *Attorney, Agent, or Firm* — Peter J. Ims; Westman, Champlin & Koehler, P.A.

(57) ABSTRACT

A device for controlling the discharge of clippings from a chute in a mowing deck of a rotary lawn mower includes a mounting bracket secured to the rotary lawn mower a distance from the mower deck and a flap pivotally attached to the mower deck. The device includes a connecting member having a first end fixedly secured to the flap and a second end supported by the mounting bracket wherein the connecting member is sufficiently flexible to be formed into a selected configuration and sufficiently rigid to retain the selected configuration during use. The device includes a handle non-rotatably secured to the connecting member proximate the second end, wherein when downward, rotational manual force is placed upon the handle, the force is transferred to the flap such that sufficient rotational force is applied thereto to move the flap to a first position that substantially covers a discharge chute on the mover deck to substantially prevent the discharge of clipping and wherein when an upward, rotational force is placed upon the handle an upward rotational force is placed upon the flap which causes the flap to rotate away from the discharge chute to a second position where the discharge port is substantially unobstructed by the flap.

20 Claims, 7 Drawing Sheets

DEVICE FOR CONTROLLING DISCHARGE OF CLIPPINGS FROM A ROTARY LAWN MOWER

CROSS-REFERENCE TO RELATED APPLICATION(S)

The present application claims the benefit of U.S. Provisional Patent Application Ser. No. 62/867,600 entitled DEVICE FOR CONTROLLING DISCHARGE OF CLIPPINGS FROM A ROTARY LAWN MOWER that was filed on Jun. 27, 2019, the contents of which are incorporated by reference in its entirety.

BACKGROUND

The present disclosure relates to a device for adjusting a position of a flap proximate a discharge port on a rotary mower to control the discharge of grass clippings from a mower. More particularly, the present disclosure relates to a manually operated system for controlling a position of a flap proximate the discharge port.

Rotary mowers are widely used to mow and maintain grass in commercial settings and lawns in residential settings. Whatever the setting, there are time that an operator wants to discharge the grass clipping onto the grass or lawn.

However, there are other times that the operator desires to prevent the discharge of grass clippings. By way of non-limiting example, the operator would want to prevent grass clippings from being discharged into landscaping or water features. If the grass clippings enter the landscaping, the operator typically utilizes a blower to remove the clippings, which can cause lighter landscaping material to be blown into the grass. Similarly, the water feature would require skimming to remove the discharged grass clippings.

In either situation, a significant amount of time can be required to remove the grass clippings from unwanted locations. The unnecessary time can be costly, especially to commercial lawn care services.

Similarly, the operator may want to control the discharge of grass clippings for safety purposes. For instance, if pedestrians are walking near the mower, the operator will want to prevent the discharge of grass clippings. Additionally, the operator will want to prevent the discharge of grass clippings towards vehicles and or bicycles passing the mower. Finally, the operator may want to prevent the discharge of grass clippings to prevent the clippings from contacting other's property to minimize or eliminate the likelihood of property damage.

Others have attempted to control the discharge of grass clipping by utilizing a flap proximate the discharge port. However, these devices can utilize actuators and electric controllers which can be expensive and unreliable.

SUMMARY

An aspect of the present disclosure relates to a mechanical device that controls the discharge of grass clippings from a discharge chute of a mower deck of a rotary mower. The device includes a mounting bracket attached to the rotary mower a distance from the mower deck and a flap pivotally attached to the mower deck. The device includes a connecting member having a first end fixedly secured to the flap and a second end supported by the mounting bracket wherein the connecting member is sufficiently flexible to be formed into a selected configuration and sufficiently rigid to retain the selected configuration during use. The device includes a handle non-rotatably secured to the connecting member proximate the second end, wherein when downward, rotational manual force is placed upon the handle, the force is transferred to the flap such that sufficient rotational force is applied thereto to move the flap to a first position that substantially covers a discharge chute on the mover deck to substantially prevent the discharge of clipping and wherein when an upward, rotational force is placed upon the handle an upward rotational force is placed upon the flap which causes the flap to rotate away from the discharge chute to a second position where the discharge port is substantially unobstructed by the flap.

Another aspect of the present disclosure relates to a device for controlling the discharge of clippings from a chute in a mowing deck of a rotary lawn mower. The device includes a first mounting bracket secured the rotary lawn mower a distance from the mower deck. The device includes a plurality of spaced apart first attaching mechanisms secured to the mower deck, each of the plurality of spaced apart first attaching mechanism comprising a first aperture that are aligned and a flap having a plurality of spaced apart first attaching mechanism attached thereto, each of the plurality of spaced apart second attaching mechanism comprising a second aperture that are aligned. A pivot member is positioned through the plurality of first and second apertures in the plurality of first and second attaching mechanism, where the pivot member having a pivot axis. The device includes a connecting member having a first end fixedly secured to one of the second attaching mechanisms a distance from the pivot axis and a second end supported by the mounting bracket wherein the connecting member is sufficiently flexible to be formed into a selected configuration and sufficiently rigid to retain the selected configuration during use. The device includes a handle non-rotatably secured to the connecting member proximate the second end, wherein when downward, rotational manual force is placed upon the handle, the force is transferred to the flap such that sufficient rotational force is applied thereto to move the flap to a first position that substantially covers a discharge chute on the mover deck to substantially prevent the discharge of clipping and wherein when an upward, rotational force is placed upon the handle an upward rotational force is placed upon the flap which causes the flap to rotate away from the discharge chute to a second position where the discharge port is substantially unobstructed by the flap.

DETAILED DESCRIPTION

The present disclosure relates to a device that is configured to attached to a rotary lawn mower where the device is configured to control the discharge from a discharge port of a mowing deck. The device is configured to use manual force to rotate a flap between a first position where the discharge chute or port is substantially covered where grass clippings are substantially prevented from being discharged from the discharge chute or port to a second position where the flap is spaced from the discharge port such that the clippings are freely discharged from the discharge port. The device can be installed by the lawn mower manufacturer or can be retrofitted onto existing lawn mowers.

Figure 1:
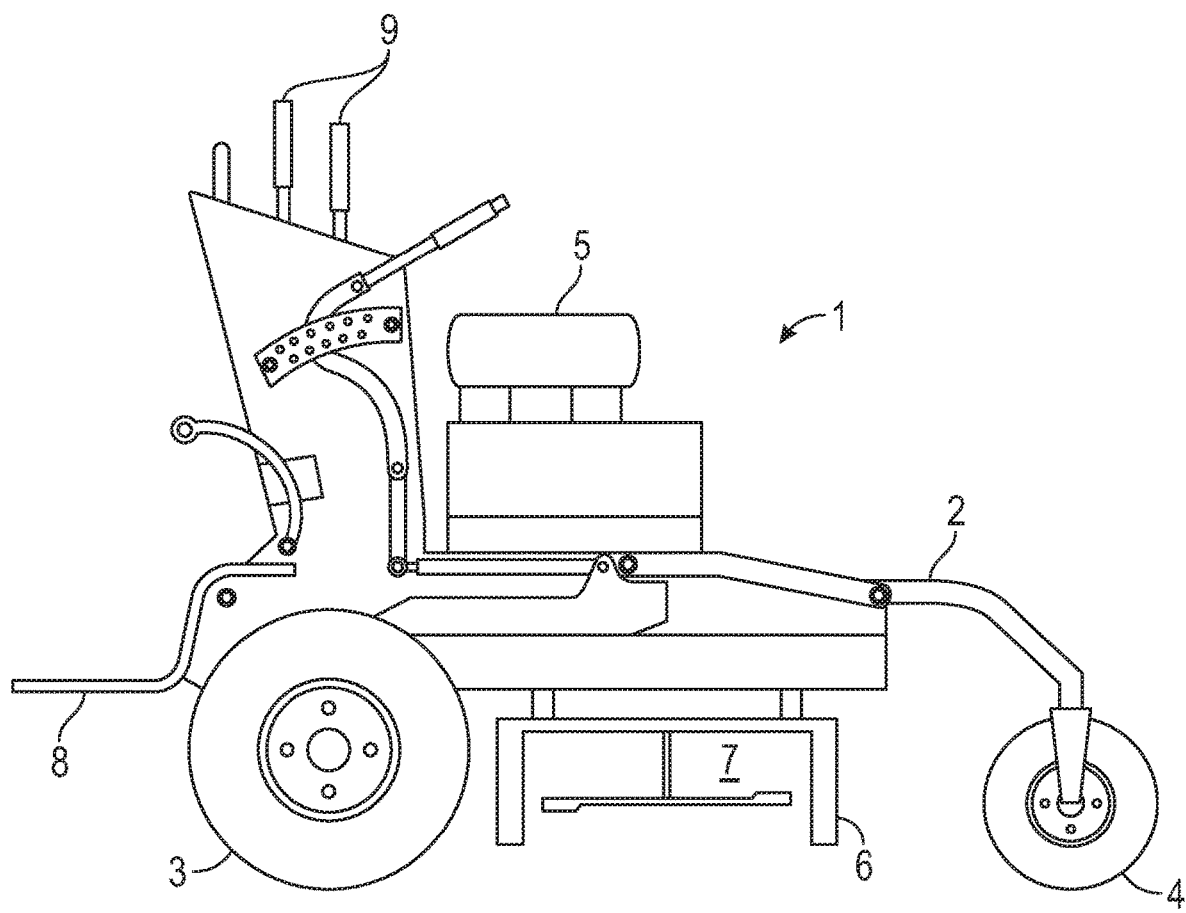
FIG. 1 is a schematic view of a lawn mower.

A typical walk behind or stand on rotary lawn mower is illustrated at 1 in FIG. 1. The lawn mower includes a chassis 2 that supports back drive wheels 3 and front wheels 4. An engine 5 is supported on a platform attached to the chassis 2, where the engine 5 powers the transmission and blades below a mowing deck 6. The mowing deck includes a discharge chute or port 7 through which clippings are discharged. In some embodiments, the mower 1 includes a stand 8 for the operator and controls 9 in front of where the operator stands. As illustrated in FIG. 1, the mower 1 is not capable of controlling when clippings are discharged from the discharge chute 7.

Figure 2:
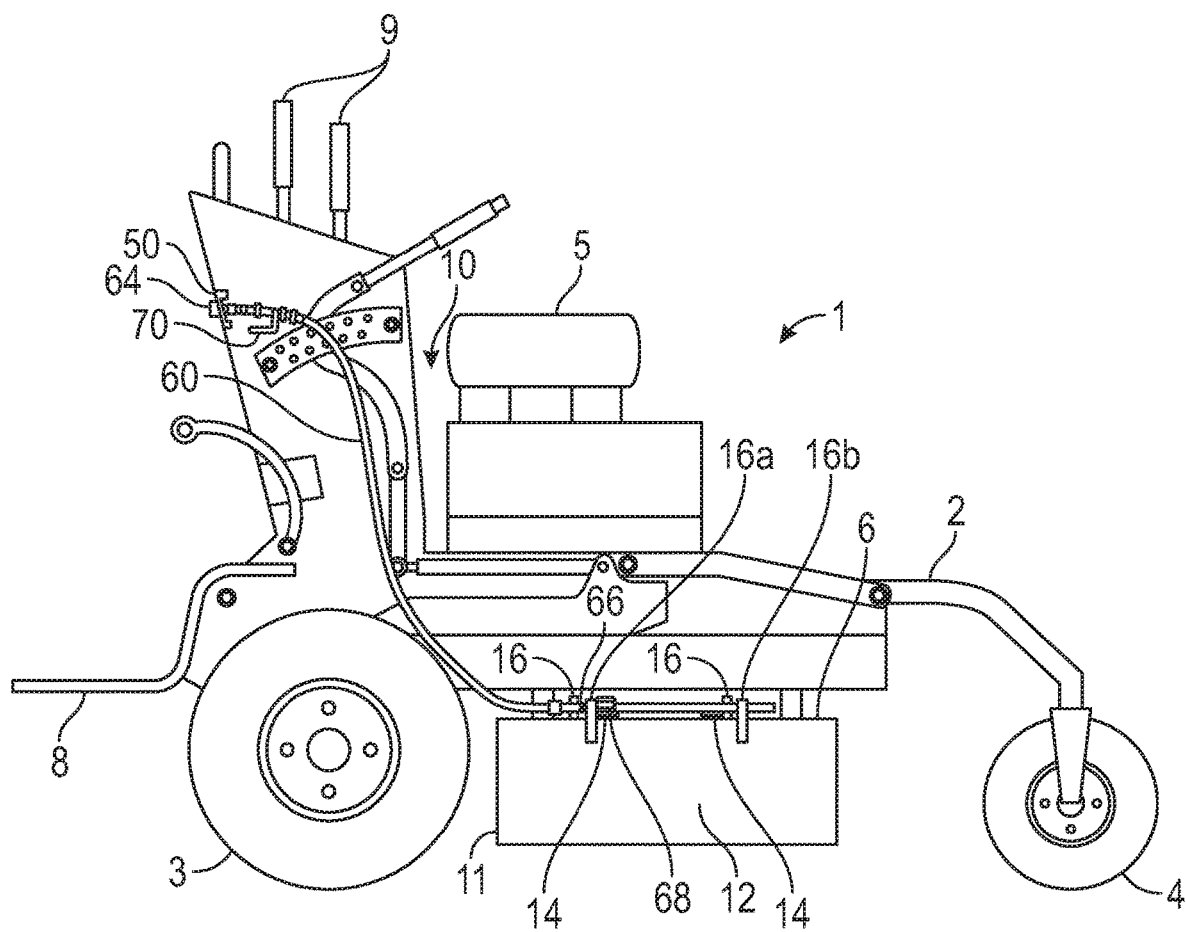
FIG. 2 is a schematic view of the lawn mower with a device for controlling a discharge of clippings wherein the device is in a closed position.
Figure 3:
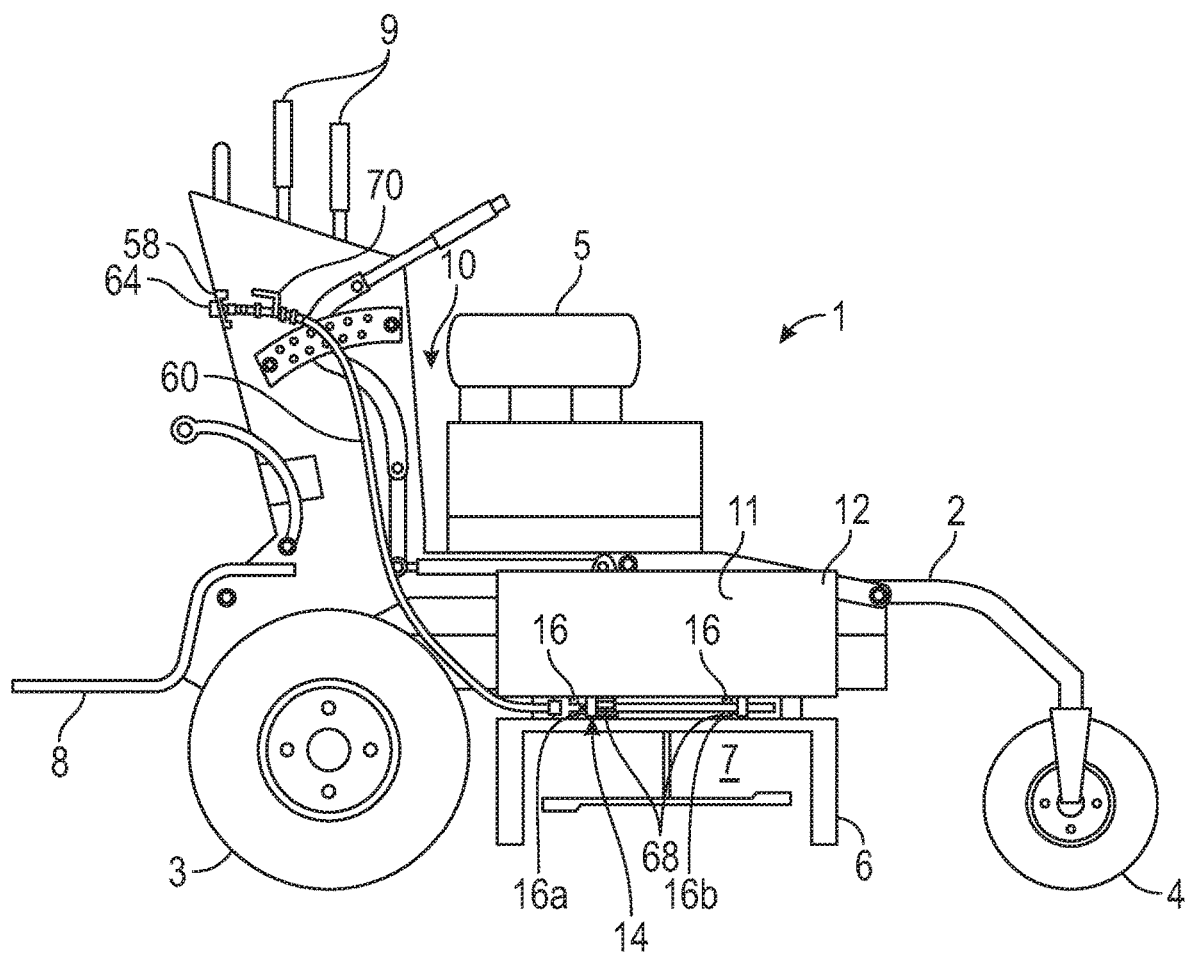
FIG. 3 is a schematic view of the lawn mower with a device for controlling a discharge of clippings wherein the device is in an open position.

A device for attaching to a rotary mower to control the discharge of grass clippings from a discharge chute is generally illustrated in FIGS. 2 and 3 at 10. The device 10 includes a flap 12 that is positionable from a first position where the flap substantially covers a discharge chute (as illustrated in FIG. 2) on a rotary mower to a second position where the discharge chute 7 is substantially unobstructed by the flap 12 (as illustrated in FIG. 3).

The device includes mounting brackets 14 configured to be attached to a mower deck 6 in a location spaced from the discharge chute or port 7, such that when the flap 12 is mounted to the mounting brackets 14, a first surface 11 of the flap 12 is positionable into the first position where the first surface 11 substantially covers the discharge chute or port 7. The mounting bracket 14 includes a first member 16a and a second member 16b which are substantially identical for ease of assembly. However, the first member 16a and the second member 16b can be mirror images or of different configurations.

The first and second member 16a and 16b are typically welded to the mower deck 6. However, the first and second members 16a and 16b can be attached with any suitable connecting mechanism, including, but not limited to, a bolt and nut and rivets.

Figure 4:
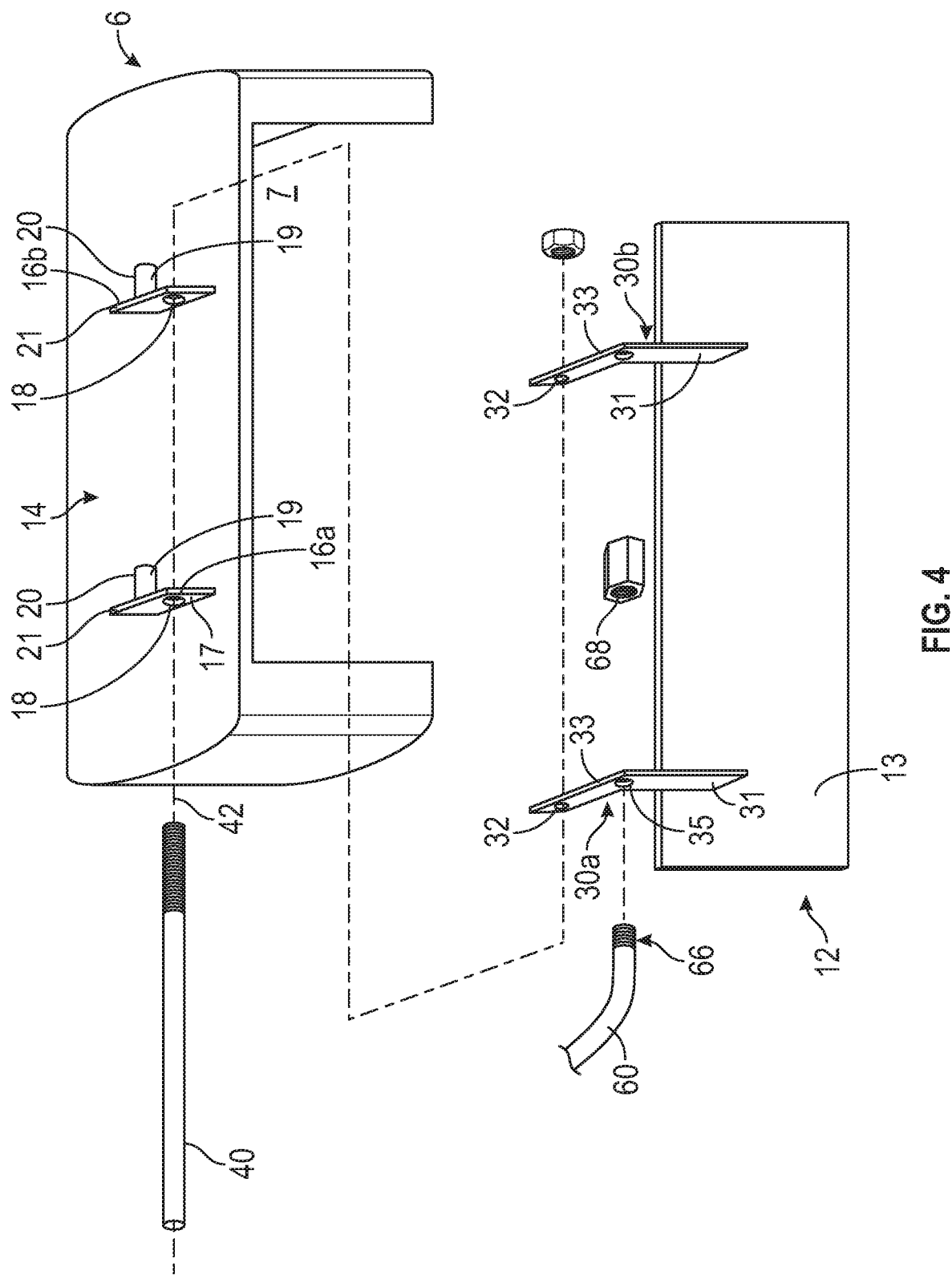
FIG. 4 is an exploded view of a mounting system for attaching a flap to a mower deck.

Referring to FIG. 4, each of the first and second members 16a and 16b includes a front portion 17 that is substantially orthogonal to a surface defining the discharge chute 7, where each front portion 17 includes an aperture 18 that aligned.

Each of the first and second members 16a and 16b includes a back portion 19 that is substantially parallel with the surface defining the discharge chute 7. The back portion 19 has a top surface 20 that is lower than a top surface 21 of the front portion 18, where the top surface 20 of the back portion 19 acts as a stop to prevent over-rotation of the flap 12 and retains the flap 12 in the second, un-obstructing position.

The mounting brackets 14 includes spaced apart first and second tabs 30a and 30b are attached to a second surface 13 of the flap 12. The tabs 30a and 30b are similarly constructed and include a substantially vertical portion 31 attached to the second surface 31 of the flap 12 that extends above a top surface of the flap 12 and a substantially horizontal portion 33 extending from the substantially vertical portion 31. The substantially horizontal portions include aligned apertures 32 that are spaced a distance from the second surface 13.

A pivot rod 40 is positioned through the apertures 18 and 32 such that the flap 12 is pivotally attached to the mower deck 6. However, because the apertures 32 are a distance from the flap 12, an eccentric motion is created as the flap 12 rotates about an axis 42 of the pivot. In the disclosed embodiment, the pivot 40 includes a threaded bolt and nut. However, any suitable pivot can be utilized including a single shaft with pins or clips inserted into the shaft at opposing ends. Further, two spaced apart pivots are also within the scope of the present disclosure including, but not limited to two bolts and nuts and two spaced apart shafts.

Figure 5:
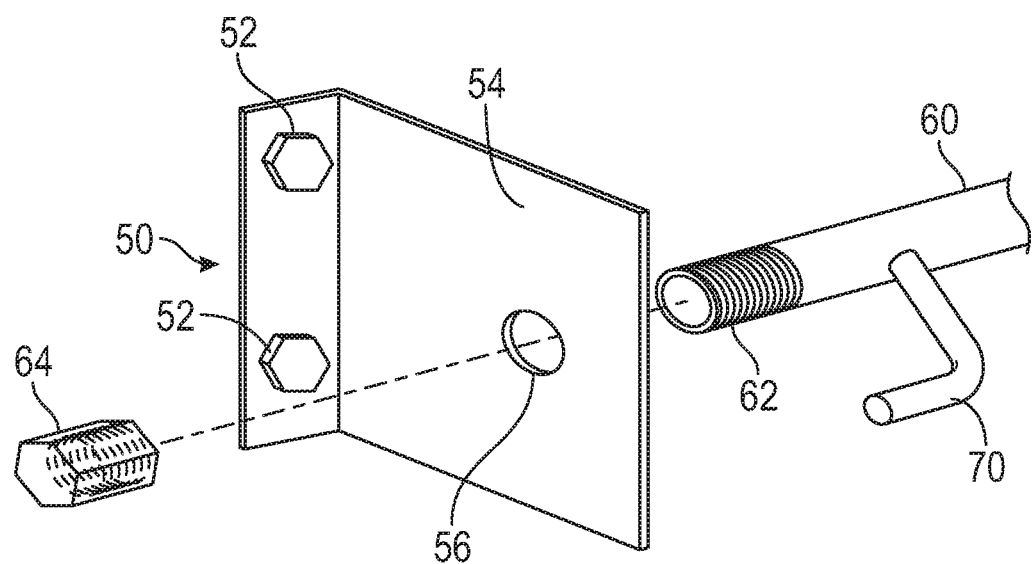
FIG. 5 is an exploded view of a mounting bracket and proximal end of a connecting member.

Referring to FIGS. 2, 3 and 5, a mounting bracket 50 is attached to the mower 1 proximate where the operator is located. The mounting bracket 50 can be in any suitable location on the mower, whether a walk behind, stand on or riding lawn mower. Once the location is selected, the mounting bracket 50 is secured to the mower 1 with an attaching mechanism. In the disclosed embodiment, the mounting bracket 50 is secured to the mower 1 utilizing bolts 52 that were being utilized for other purposes. However, the mounting bracket 50 can be attached by drilling holes in the mower 1 and utilizing bolts and nuts or welding the mounting bracket 50 to the mower 1.

Figure 6:
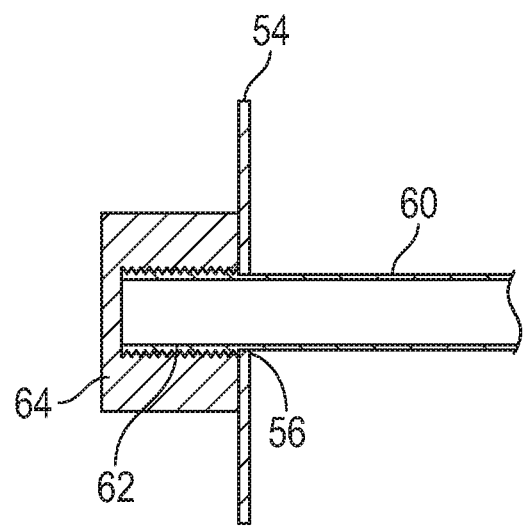
FIG. 6 is a sectional view of the mounting bracket and proximal end of the connecting member

Referring to FIGS. 5 and 6, the mounting bracket 50 includes a tab 54 that has an aperture 56 that configured to accept a proximal end 62 of a connecting member 60 that connects a handle 70 to the flap 12. In one embodiment, the proximal end 62 is threaded where a threaded cap 64 or nut is secured thereto retain the proximal end 62 to the mounting bracket 50 while the proximal end 62 is configured rotates with the aperture 56.

Figure 7:
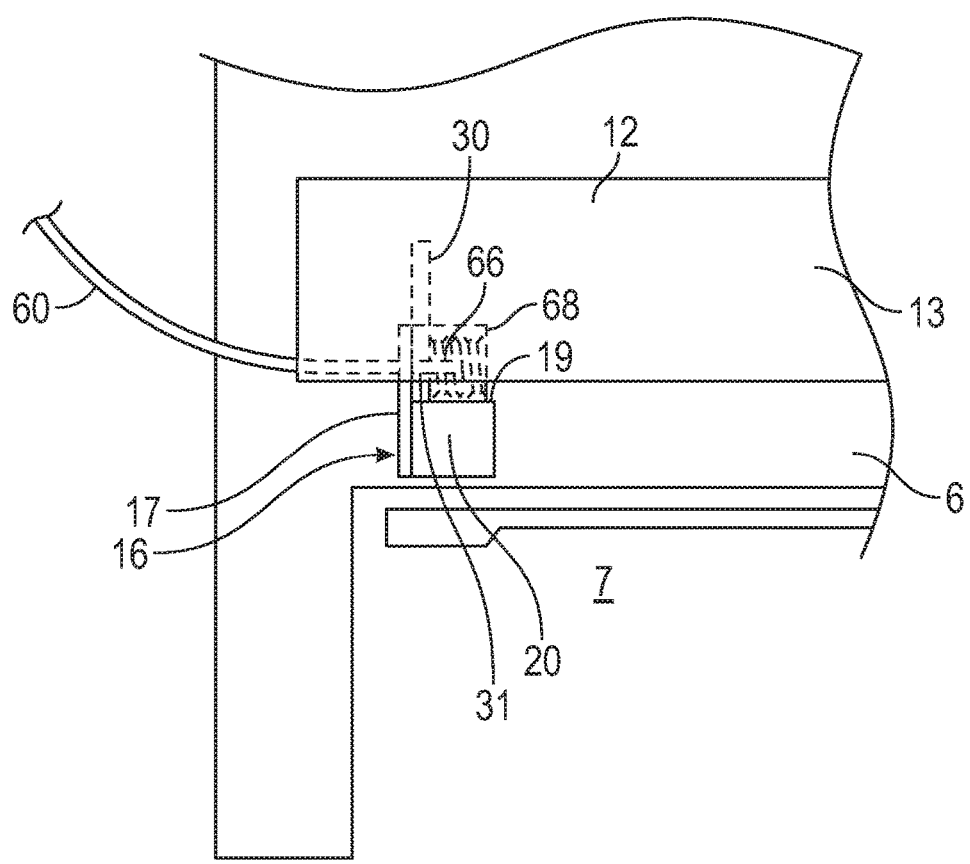
FIG. 7 is a schematic view of the flap in a non-obstructing position where a stop is utilized to retain the flap in the non-obstructing position.

Referring to FIG. 7, a distal end 66 of the connecting member 60 is positioned through an aperture 35 in the first tab 30a where the aperture 35 is located proximate a second surface 13 of the flap 12. A threaded cap 68 engages the distal end 66 to frictionally and non-rotatably secure the distal end 66 to the tab 30a.

Figure 8:
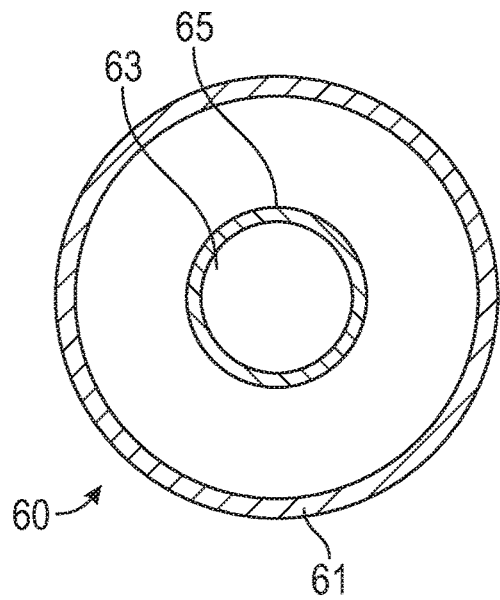
FIG. 8 is a sectional view of the connecting member.
Figure 9:
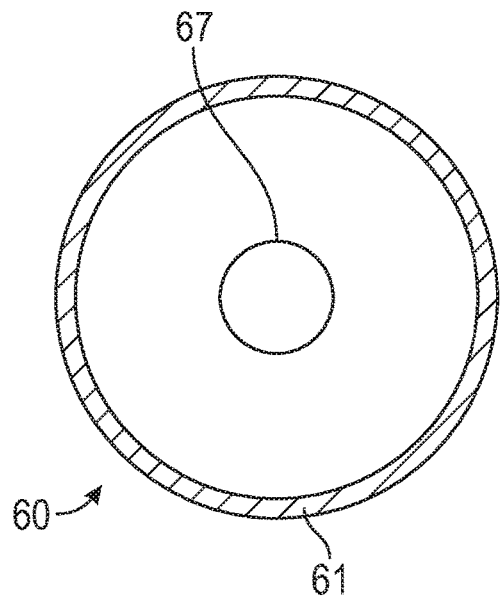
FIG. 9 is a sectional view of another embodiment of the connecting member.

The connecting member 60 is sufficiently flexible to be positioned in any selected configuration. However, the connecting member 60 is also sufficiently rigid or tough to retain the selected shape, such that the connecting member will not excessively twist or deform during use. Referring to FIG. 8, an exemplary, but not limiting, connecting member is a ½ inch inner diameter or Dash 8 hydraulic hose 61 with threaded ends where ¼ inch diameter steel guy wire 63 covered with a 5/16 inch inner diameter and 7/16 inch outer diameter polyethylene water line 65 is inserted into the hose 61 to provide additional rigidity. Alternatively, referring to FIG. 9, an aluminum electrical wire 67 can be placed inside of the hydraulic hose 61 to provide the necessary rigidity and toughness to retain a selected configuration and not excessively twist when subjected to a torque when moving the flap 12 from the first position to the second position and back. While a hydraulic hose with a wire insert is disclosed, the connecting member can be made of any suitable material that is sufficiently flexible to adapt to numerous styles and models of mowers while being sufficiently rigid or tough to retain a selected configuration and be able to withstand torques required to move the flap 12.

The connecting member 60 also has a handle 70 non-rotatable attached thereto in a location proximate the proximal end 62. The location provides the operator the ability to easily to grasp and apply manual force to the handle 70 which provides sufficient force to move the flap 12 to a selected position.

Once the device 10 is installed, the operator can control the discharge of clippings from the discharge chute 7 by manipulating the position of the flap 12. When the operator desires to substantially prevent the discharge of clippings from the discharge chute 14, the operator applies a downward force on the handle 70 which causes the connecting member 60 to rotate within aperture 56 in the mounting bracket 50. Because the connecting member 60 is sufficiently rigid to withstand the torque caused by the downward force, the distal end 66 of the connecting member 60 transfers the rotational force to the flap 12 and causes an eccentric motion about the pivot axis 42 of the pivot rod 40 such that the surface 11 of the flap 12 substantially covers the discharge chute 7.

When the operator desires that the clipping discharge through the discharge chute 7, the operator applies an upward manual force on the handle 70. The manual force causes the proximal end 62 of the connecting member 60 to rotate within the aperture 56 of the mounting bracket 50. Further, the manual force is transferred through the connecting member 60 to the distal end 66 which applies a rotational force onto the flap 12, which cause the flap 12 to pivot about the axis. The upward rotational movement of the flap 12 is limited by the engagement of the cap 68 with the upper surface 20 of the back portion 19 of the first member 16*a* of the mounting bracket 14 (as illustrated in FIG. 7), When in the second position, the flap 12 has move past vertical such that gravity aids in retaining the flap 12 and the handle 70 is moved over vertical such that the weight of the handle 70 aids in retaining the handle 70 in the over vertical position.

Figure 10:
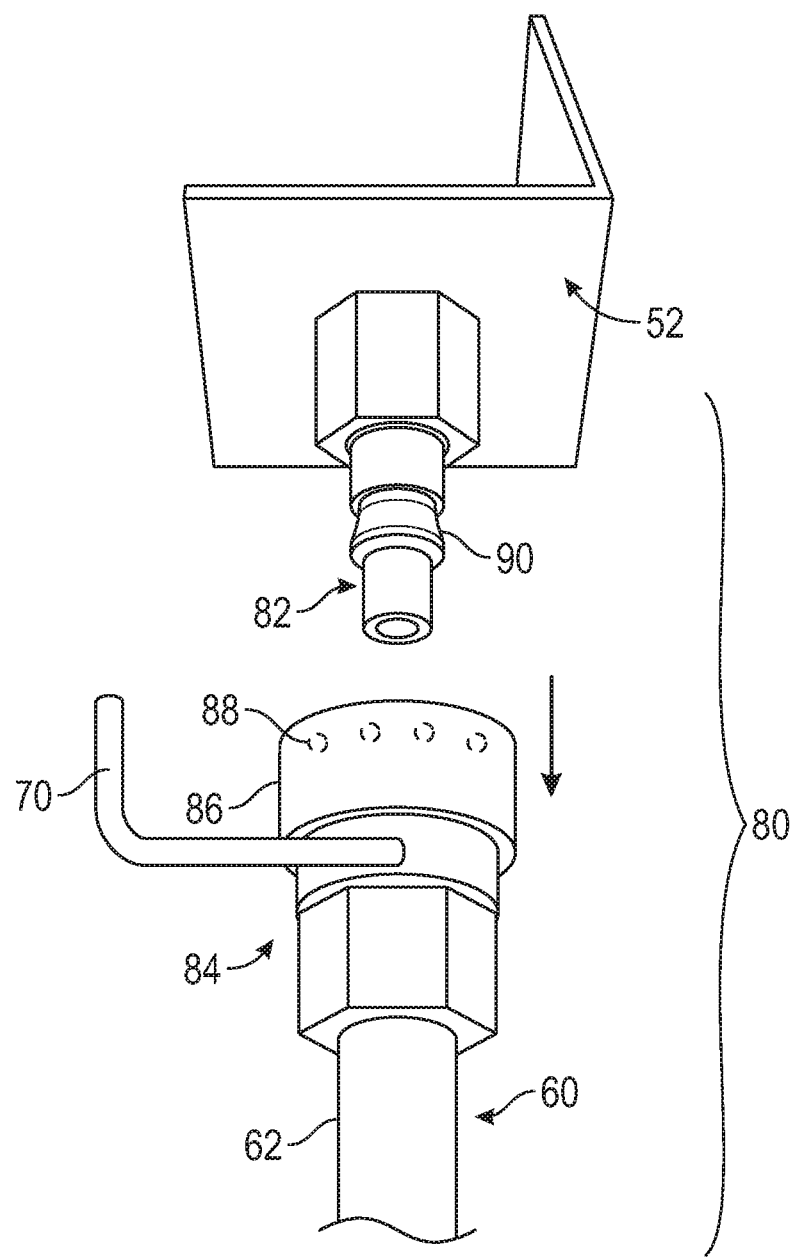
FIG. 10. is an exploded view of another connecting member for the bracket and the proximal end of the connecting member.

As illustrated, the proximal end 62 is retained to the mounting bracket 50 with a threaded engagement. However, referring to FIG. 10, another attaching mechanism is illustrated where a male portion 82 of a hydraulic coupling 80 is securely attached to the mounting bracket 50 and a female portion 84 of the hydraulic coupling is secured to the proximal end 62 of the connecting member 60. A slide 86 is moved backward to allow ball bearings 88 within the female portion 84 to be positioned in a groove 90 in the male portion 82. With the ball bearings 88 within the groove 90, the slide 86 is moved over the ball bearings to retain the male and female portions 82 and 84 together and allows the female portion 84 of the coupling 80 to rotate about the male portion 82. The handle 70 is attached to the female portion 84, where manual force is applied to the handle 70 to cause the flap 7 to rotate between the first and second positions, as discussed above.

Although the present disclosure has been described with reference to preferred embodiments, workers skilled in the art will recognize that changes may be made in form and detail without departing from the spirit and scope of the disclosure.

The invention claimed is:

1. A device for controlling the discharge of clippings from a chute in a mowing deck of a rotary lawn mower, the device comprising:

a mounting bracket secured to the rotary lawn mower a distance behind the mower deck in a direction of forward travel of the rotary lawn mower;

a flap pivotally attached to the mower deck;

a connecting member having a first end fixedly secured to the flap and a second end supported by the mounting bracket wherein the connecting member is sufficiently flexible to be formed into a selected configuration and sufficiently rigid to retain the selected configuration during use; and a handle non-rotatably secured to the connecting member proximate the second end, wherein when downward, rotational manual force is placed upon the handle, a first torque force in a first rotational direction is transferred to the flap to move the flap to a first position that substantially covers a discharge chute on the mover deck to substantially prevent the discharge of clipping and wherein when an upward, rotational force is placed upon the handle a second torque force in a second rotational direction, substantially opposite the first rotation direction, is placed upon the flap which causes the flap to rotate away from the discharge chute to a second position where the discharge chute is substantially unobstructed by the flap.

2. The device of claim 1, wherein the connecting member comprises a hydraulic hose.

3. The device of claim 2, and further comprising a stiffening member within the hydraulic hose.

4. The device of claim 3, wherein the stiffening member comprises a steel guy wire covered with a polyethylene water line.

5. The device of claim 3, wherein the stiffening member comprises an aluminum electrical wire.

6. The device of claim 1, wherein the second end of the connecting member is attached to the mounting bracket with a hydraulic hose coupler.

7. The device of claim 6, wherein a male portion of the hydraulic hose coupler is non-rotatably attached to the mounting bracket and the a female portion of the hydraulic hose is attached to the second end of the connecting member wherein the female portion rotates about the male portion and wherein the female portion is removably attached to the male portion.

8. The device of claim 1 wherein the second end of the connecting member is rotatably attached to the mounting bracket.

9. The device of claim 1, wherein the first end of the connecting member is fixedly attached to the flap with a threaded engagement.

10. The device of claim 1, and further comprising:

a pivot pin configured to pivotally couple the flap to the mower deck wherein the pivot pin has a pivot axis, wherein the pivot axis is spaced from the attachment of the first end of the connecting member to the flap.

11. The device of claim 1, wherein when the flap is in the second position, the flap is moved past vertical such that gravity aids in retaining the flap in the second position.

12. The device of claim 1, wherein the flap is rotated to the second position, the handle is moved past vertical such that gravity aids in retaining the handle in a location past vertical.

13. A device for controlling the discharge of clippings from a chute in a mowing deck of a rotary lawn mower, the device comprising:

a first mounting bracket secured the rotary lawn mower a distance behind the mower deck in a forward direction of travel of the rotary lawn mower;

a plurality of spaced apart first attaching mechanisms secured to the mower deck, each of the plurality of spaced apart first attaching mechanism comprising a first aperture that are aligned a flap having a plurality of spaced apart first attaching mechanism attached thereto, each of the plurality of spaced apart second attaching mechanism comprising a second aperture that are aligned;

a pivot member positioned through the plurality of first and second apertures in the plurality of first and second attaching mechanism, the pivot member having a pivot axis;

a connecting member having a first end fixedly secured to one of the second attaching mechanisms a distance from the pivot axis and a second end supported by the mounting bracket wherein the connecting member is sufficiently flexible to be formed into a selected configuration and sufficiently rigid to retain the selected configuration during use; and a handle non-rotatably secured to the connecting member proximate the second end, wherein when downward, rotational manual force is placed upon the handle, a torque force in a first rotational is transferred to the flap such that sufficient torque force is applied thereto to move the flap to a first position that substantially covers a discharge chute on the mover deck to substantially prevent the discharge of clipping and wherein when an upward, rotational force is placed upon the handle a second torque force, substantially in an opposite rotational, is placed upon the flap which causes the flap to rotate away from the discharge chute to a second position where the discharge chute is substantially unobstructed by the flap.

14. The device of claim 13, wherein the connecting member comprises a hydraulic hose.

15. The device of claim 14, and further comprising a stiffening member within the hydraulic hose.

16. The device of claim 15, wherein the stiffening member comprises a steel guy wire covered with a polyethylene water line.

17. The device of claim 15, wherein the stiffening member comprises an aluminum electrical wire.

18. The device of claim 13, wherein the second end of the connecting member is attached to the mounting bracket with a hydraulic hose coupler.

19. The device of claim 18, wherein a male portion of the hydraulic hose coupler is non-rotatably attached to the mounting bracket and the a female portion of the hydraulic hose is attached to the second end of the connecting member wherein the female portion rotates about the male portion and wherein the female portion is removably attached to the male portion.

20. The device of claim 13, wherein the second end of the connecting member is rotatably attached to the mounting bracket.

* * * * *